United States Patent
Wittenschlaeger

(10) Patent No.: US 7,548,556 B1
(45) Date of Patent: Jun. 16, 2009

(54) SECURE COMMUNICATION THROUGH A NETWORK FABRIC

(75) Inventor: Thomas Michael Wittenschlaeger, Irvine, CA (US)

(73) Assignee: Raptor Networks Technology, Inc., Santa Ana, CA (US)

( * ) Notice: Subject to any disclaimer, the term of this patent is extended or adjusted under 35 U.S.C. 154(b) by 0 days.

(21) Appl. No.: 12/146,325

(22) Filed: Jun. 25, 2008

Related U.S. Application Data

(60) Provisional application No. 61/013,852, filed on Dec. 14, 2007, provisional application No. 61/014,367, filed on Dec. 17, 2007, provisional application No. 61/032,656, filed on Feb. 29, 2008.

(51) Int. Cl.
*H04J 15/00* (2006.01)

(52) U.S. Cl. ...................................... 370/464

(58) Field of Classification Search ........................ None
See application file for complete search history.

(56) References Cited

U.S. PATENT DOCUMENTS

| | | | |
|---|---|---|---|
| 4,802,220 A | | 1/1989 | Marker, Jr. |
| 6,160,819 A * | | 12/2000 | Partridge et al. ............ 370/474 |
| 6,771,597 B2 | | 8/2004 | Makansi et al. |
| 6,941,252 B2 * | | 9/2005 | Nelson et al. .................. 703/2 |
| 6,965,615 B1 * | | 11/2005 | Kerr et al. .................... 370/474 |
| 7,010,590 B1 | | 3/2006 | Munshi |
| 7,185,062 B2 * | | 2/2007 | Lolayekar et al. ........... 709/213 |
| 7,233,590 B2 | | 6/2007 | Beshai |
| 7,289,509 B2 * | | 10/2007 | Brown et al. ............. 370/395.1 |
| 7,307,995 B1 * | | 12/2007 | Iyer et al. ............. 370/395.32 |
| 7,406,038 B1 * | | 7/2008 | Oelke et al. ................. 370/225 |
| 2004/0083361 A1 | | 4/2004 | Noble et al. |
| 2008/0101367 A1 | | 5/2008 | Weinman |

OTHER PUBLICATIONS

Hoffman, Building a Distributed Fabric with Raptor Adaptive Switch Technology (RAST™), White Paper, Raptor Networks Technology, Inc., 10 pages, 2007.*

\* cited by examiner

*Primary Examiner*—Frank Duong
(74) *Attorney, Agent, or Firm*—Fish & Associates, PC

(57) ABSTRACT

Methods of providing a secure communication over a network fabric are presented. A network fabric preferably comprises multiple interconnected network elements. Devices connect to the fabric through one or more ports and communicate with each other over the fabric by exchanging communications. A port-to-port session can be established within which multiple communication paths can be constructed. As devices communicate via the ports, the communication can be divided into data chunks and transmitted along different paths. Additionally, each chunk can be independently encrypted on one or more legs of its journey across the fabric.

20 Claims, 3 Drawing Sheets

SECURE COMMUNICATION THROUGH A NETWORK FABRIC

This application claims the benefit of priority to U.S. provisional application 61/013,852 filed on Dec. 14, 2007; U.S. provisional application 61/014,367 filed on Dec. 17, 2007; and U.S. provisional application 61/032,656 filed on Feb. 29, 2008.

FIELD OF THE INVENTION

The field of the invention is secure network communication infrastructure.

BACKGROUND

Traditional networks secure communications between two devices by employing well known host-to-host security measures. Typically public keys are exchanged between devices and then the data exchanged between the devices is encrypted through private or secret keys. Well known security protocols and algorithms for securing a communication include HTTPS, SSL, SSH, RAIDUS, Kerberos, OpenID, AES, DES, 3DES, or PKI among many others.

Although much effort has been placed to secure data with respect to Confidentially, Integrity, and Authentication (CIA), data can still fall victim to attack. Typical attacks can include a man-in-the-middle attack where an entity, hostile or otherwise, eavesdrops on all communications on a link between the two devices. The attacker can record the data exchanged and, given enough computing resources, eventually crack the security measures to reveal secured data.

Other issues also exist with traditional security measures. Ciphers typically employed in encryption conduct data transformations in a serial fashion and place an undue computational burden on the devices. The result is that the maximum achievable throughput for a secured communication severely lags behind the throughput supported by current communication infrastructure technology. For example, current networks can employ 10 Gbps data channels. However, a conventional device connected to a network would find it difficult to transmit encrypted communications at data rates remotely close to 10 Gbps while still retaining sufficient CPU bandwidth for other applications.

Offloading encryption responsibilities to support modules or adapters offers a poor solution due to the cost of adapters.

U.S. Pat. No. 4,802,220 to Marker provides for a multi-channel communication security system where information in a message is split among a number of channels of an ISDN line. Such an approach is likely useful for ISDN; however, Marker fails to fully alleviate the overhead of establishing and maintaining secure communications. Rather, Marker requires installation of costly communication adapters within user stations.

U.S. Pat. No. 6,771,597 to Makansi et al. discusses methods of transmitting a message as packets over a network using different techniques, including transmitting the packets through different routes in a network. Unfortunately, Makansi also lacks support for offloading security overhead from the communicating devices.

U.S. Pat. No. 7,010,590 to Munshi provides for secure transactions over a insecure packet-switched network by encrypting packets and transmitting the packets via pseudo-random communication paths. Although Munshi makes further progress toward secure communications, Munshi fails to offer a way to maintain fine grained control of secure communications among devices.

U.S. Pat. No. 7,233,590 to Beshai describes sending a stream of data from a source node to a core node of a network by distributing the data streams through multiple time slots across several channels. The Beshai approach provides for routing support, but lacks sufficient support for having the network provide protection for a communication between two devices.

U.S. patent publication 2004/0083361 to Noble et al. describes, among other things, transmitting data in a secure fashion by transforming the data and spreading the transformed data piecewise across a plurality of transmission channels. Noble also fails to fully address the need for off-loaded security.

U.S. patent publication 2008/0101367 to Weinman makes a bit further progress for providing security by transmitting packets along different routes based on a security policy where a route can be selected from a set of pre-provisioned routes. However, Weinman fails to adequately secure the actual communication between devices.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

It has yet to be appreciated that a network can take responsibility for securing communication between devices by establishing a port-to-port session where the session can be used to maintain a fine grained control over the secure communication. For example, a network could partition a communication into data chunks where each chunk is sent along different paths from an ingress port to an egress port within a secure session. Such an approach offers several advantages. First, the communication is distributed across multiple paths, channels, or links, rendering a man-in-the-middle attack impractical. Second, each chunk can be encrypted separately, effectively offering a parallel encryption process. Each path, channel, or link in the network could be secured individually to secure a communication. Such benefits can be realized by establishing a secured communication session between two ports of the network fabric rather than requiring devices, or applications running on the devices, to establish a secure connection.

Thus, there is still a need for providing secure communications across a network fabric.

SUMMARY OF THE INVENTION

The present invention provides apparatus, systems and methods in which devices communicate with each other in a secure fashion across a network fabric comprising a plurality of interconnected network elements.

In one aspect of the inventive subject matter, devices connect to the fabric through one or more physical ports of the network elements. A communication session, referred to as a "session" for brevity, can be established between two or more physical ports to which the devices are connected. Within the session, two or more communication paths can be constructed between the ports or among the ports if more than two devices are communicating with each other. In a preferred embodiment, the paths are constructed according to a secure function based on a secret key. When a communication is received from a device at a port, the communication can be divided into chunks and sent along different ones of the paths. The risk of an external hostile entity compromising the communication can be significantly reduced through sending data chunks along the various paths. Additionally each chunk can be independently encrypted as it transits across data links between network elements of the fabric.

Sessions can be autonomously managed independently from the communicating devices. Sessions can be created when desired, possibly by a system administrator or through automatic detection of a secure communication between devices. Once a session has outlived its utility, it can also be deconstructed, turned off, or otherwise removed from use. Additionally communication paths within an established session can be constructed in a manner that is transparent to the communicating devices.

Communication paths within a session can be reconfigured as desired. Reconfiguration of the paths can include changing a channel on a data link (e.g., changing a wavelength used on an optic fiber), adding or removing paths within the session, re-routing existing paths to traverse alternative elements, or other types of reconfiguration. In a preferred embodiment, the reconfiguration of communication paths occurs in a time period less than the average latency experienced by the communicating devices. Path reconfiguration can also occur while data chunks are in flight without loss of a chunk of data.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
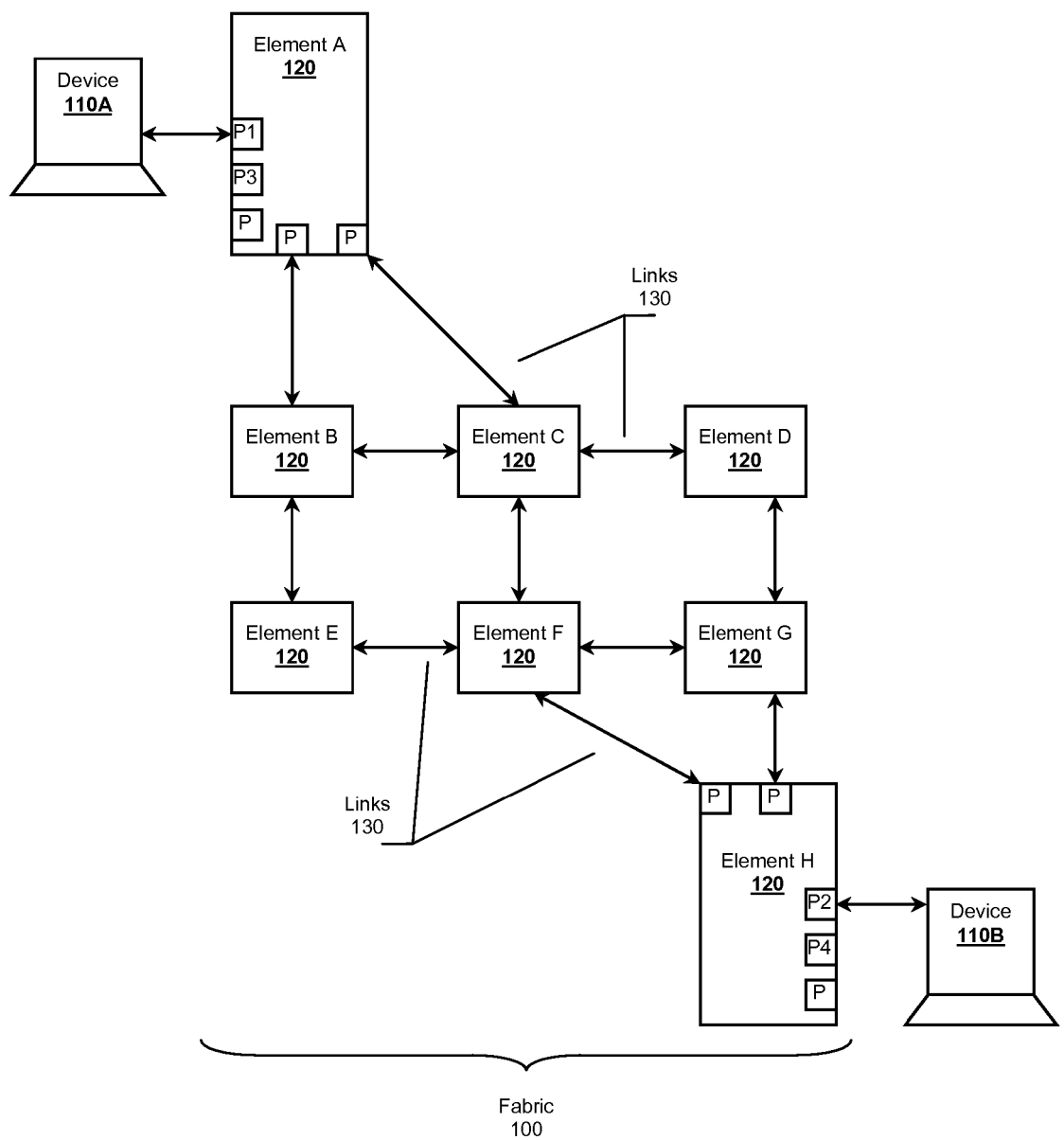
FIG. 1 is a schematic of a network fabric that provides secure communications between two devices.

In FIG. 1, one or more of devices 110A and 110B, referred to as devices 110, exchange communications with each other over network fabric 100. Network fabric 100 comprises a plurality of network elements 120, elements A through H, interconnected through a plurality of data links 130. In a preferred embodiment, network element 120 comprises one or more ports P through which element 120 connects to devices 110A or other elements 120.

Fabric Overview

In the example shown, device 110A couples to element A 120 at port P1. Device 110A sends data to device 110B by sending data through port P1. Element A 120 receives the data and forwards the data through one or more of its other ports P to other elements 120. Each of elements 120, in turn forwards the data onward toward element H 120. Element H 120 receives the data through one or more of its ports P. Element H 120 presents the data to Device 110B through port P2.

Devices 110A or 110B can include any suitably enabled network device. Contemplated devices include computers, vehicles, appliances, set-top boxes, game consoles, cell phones, PDAs, or other devices capable of connecting to network fabric 100. It is also contemplated that Devices 110A or 110B could also comprise elements 120.

Network elements 120 preferably comprise packet-switched networking infrastructure devices including switches, routers, gateways, access points, or other networking devices. Network elements 120 also comprise sufficient memory and processing capabilities for storing data exchanged between devices 110A and 110B as well as functioning according to the techniques disclosed herein.

Links 130 represent a media interconnecting elements 120, wired or wireless. Preferred links 130 support high throughput communication having low latency while also supporting multiple data channels over a single link. Yet more preferred links include those that support communication among elements over geographically significant distances greater than 10 Km or more than 100 Km.

Preferred links 130 comprises optic fibers supporting multiple data channels where each data channel operates at its own wavelength. Especially preferred links include optic fiber links capable of transporting data over geographically significant distances. For example, a single mode optic fiber can support transmission of data over a distance of up to 40 Km at a wavelength of 1550 nanometers (nm) with a throughput of 10 Gbps. An additional example of a fiber optic link includes those under development by the IEEE 802.3 Higher Speed Study Group. The contemplated fibers support bandwidths from 40 Gbps to 100 Gbps over distances up to 40 Km using a single mode optical fiber.

Preferred links 130 allow for communications across the fabric with low latencies of less than 100 microseconds, or more preferably with a latency of less than 10 microseconds.

Although preferred links are optic fibers, one skilled in the art will recognize that other links can also be used to support the inventive subject matter. For example, one could form network fabric 100 from a mesh network of wireless routers that are interconnected via 802.11 connections, or network fabric 100 could comprise Ethernet switches interconnected through cabling.

Ports P represent physical interfaces through which elements 120 connect to devices 110, or connect to other elements 120. Ports P can be homogenous within an element 120 or heterogeneous. Ports P can couple to each other through wired or wireless links 130 or couple to devices 110A or 110B.

In a preferred embodiment, fabric 100 comprises a distributed core fabric where network elements 120 operate as a single coherent device. From the perspective of devices 110A and 110B, port P1 and port P2 appear to be on the same network element.

Examples of acceptable network elements 120 include network switches developed and produced by Raptor Network Technology, Inc. (http://www.raptor-networks.com) of Santa Ana, Calif. The Raptor switches can be used to form a distributed core fabric that appears to function as a single geographically distributed switch. The Raptor ER-1010 switch offers several advantages including providing communication with latency less than 10 microseconds, throughput greater than 30 Gbps through link aggregation of optic fiber links, as well as communication over geographically significant distances. Raptor's switch technology is more fully described in U.S. Pat. No. 7,352,745 and in U.S. patent applications having Ser. Nos. 10/965,444, 11/248,710, 11/248,711, 11/248,708, 11/248,111, 11/248,639, and 11/248,707.

It is also contemplated that other network equipment vendors could also adapt their products to offer the capabilities disclosed within this document. Other vendors of networking equipment include Juniper Networks (http://wwwjuniper-.net) of Sunnyvale, Calif., or Cisco Systems, Inc. (http://www.cisco.com), of San Jose, Calif. One should note that the concept of adapting legacy products to employ the disclosed capabilities also falls within the scope of the inventive subject matter.

In a preferred embodiment, fabric 100, possibly through a fabric manager, updates individual elements 120 with respect to routes across the fabric. Elements 120 use the routing information to determine how to forward received data chunks. For example, a data chunk having data originating from device 110A would indicate that the source of the data is connected to port P1 and that the data chunk is destined toward port P2. Element F 120 might receive a data chunk and consult its stored routing tables and session information. Upon inspection of the table, element F 120 would forward the packet to element H 120. Co-owned U.S. Pat. No. 7,352,745, titled "Switching System with Distributed Switching Fabric" describes methods for establishing routes across fabrics.

Figure 2:
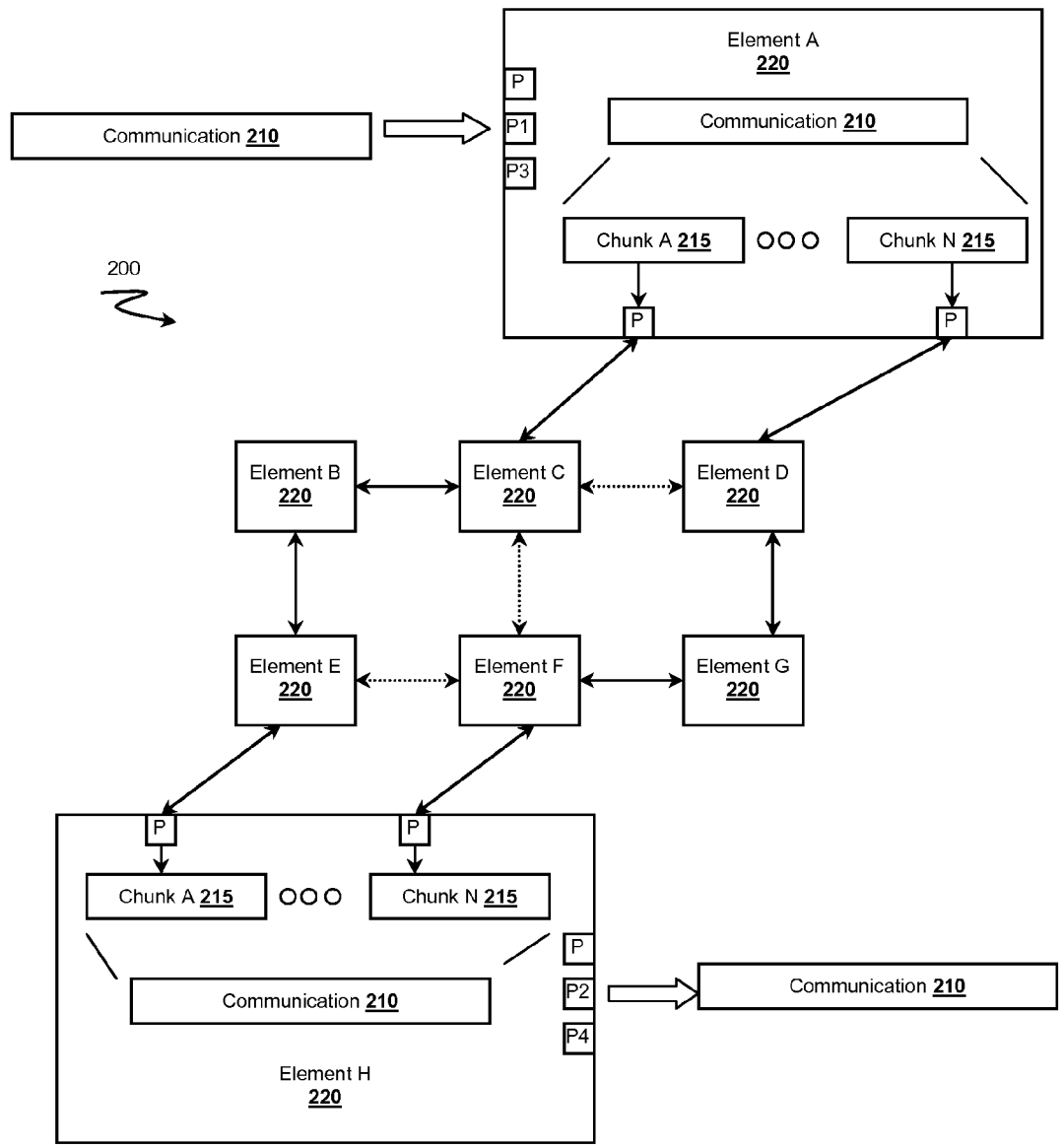
FIG. 2 is a schematic of a network fabric where a communication is divided into chunks and each chunk is sent along a different path across the fabric.

In FIG. 2, communication 210 from a first device is sent across fabric 200 comprising interconnected elements 220. Preferably, fabric 200, possibly by element A 220, divides communication 210 into two or more of chunks 215 represented by chunks A 215 through N 215. Chunks 215 can be transmitted from element A 220 to element H 220 individually along different paths through fabric 200. For example, chunk A 215 can be transmitted along a path defined by elements 220 "CBE" while chunk N 215 can be transmitted along a different path defined by elements 220 "DGF".

Communication paths for a session in FIG. 2 are shown as solid arrowed lines. Dotted arrowed lines indicate existing, active links that are not members of a constructed communication path within the established session between ports P1 and P2.

Communications

The term "communication" is used euphemistically to refer to a data exchange between two devices, unidirectional or bidirectional. Communication 210 can represent a message of information originating from a source device and addressed to or otherwise targeting a destination device. Communication 210 can take the form of nearly any data exchange including those based on datagrams (e.g., protocols based on UDP), stream communications (e.g., protocols based on TCP), Ethernet frames, or other data passing schemes. Preferred communication 210 comprises one or more packets where each packet provides an indication of its intended destination device (e.g., MAC address, IP address, etc. . . . ). Fabric 200 can correlate the destination information to a port on the fabric.

In a preferred embodiment, communication 210 is transmitted across fabric 200 within a secured communication session established between port P1 and port P2. Although the example shown in FIG. 2 illustrates communication 210 utilizing ports P1 and P2, one should appreciate that a session can support multiple ingress ports for a source device or multiple egress ports for a destination device, possibly using port aggregation or a multilink protocol.

Sessions

A session comprises a persistent secure communication means where data is exchanged between at least two of ports P of network fabric 200, preferably physical interface ports represented by edge ports P1 and P2 for example. In some embodiments, sessions can support more than two ports. For example, a single session could provide secure communication among ports P1, P2, P3, or P4 regardless of their location in the fabric. Devices connected to ports P1 through P4 can then exchange data with each other freely without establishing secure connections to each other. Such an approach reduces the processing overhead of the communicating devices by offloading responsibility for securing communication to fabric 200.

Preferred sessions represent manageable objects within fabric 200 that can be established (e.g., brought into being) when desired, deconstructed (e.g., deleted or removed) when no longer required, toggled on or off, monitored, or otherwise managed. In a preferred embodiment, sessions are managed by a fabric manager independently from the communicating devices.

In an embodiment where elements 220 are fungible with respect to management responsibility, any one of elements 220 can become the fabric manager and manage sessions. The fabric manager provides updated session management information to elements 220 as sessions are established, deconstructed, or otherwise altered. Acceptable fabric management techniques can be found in co-owned U.S. patent application Ser. No. 12/120,024 titled "Disaggregated Network Management".

In a preferred embodiment, when a session is established, it is assigned an identifier for use by fabric 200 or by elements 220 when forwarding chunks 215 among elements. Preferred identifiers correlate to the ports for which the session is established. For example, when a fabric manager establishes a session between ports P1 and P2, the fabric manager can assign the session a GUID that correlates to ports P1 and P2, possibly through a lookup table. The fabric manager can then communicate session management instructions to elements 220 for a session by referencing the GUID. Having a manageable session offers fine grained control over secure communications among ports.

Regardless of the type of identifier used to reference a session, each of chunks 215 can be flagged with the session identifier. Upon reception, elements 220 inspect chunks 215 for their session identifier and consult the session's routing information. Element 220 uses the routing information to determine which of its ports should be used to forward chunk 215 on toward its destination.

A session between or among ports can be established at any time autonomously with respect to the communicating devices. In some embodiments, a system administrator utilizes fabric management software to establish and configure sessions among ports P of fabric 200 without the knowledge of the connected devices. Preferred management software provides the ability to establish static sessions that exist until manually deconstructed or dynamic sessions that can be established, deconstructed, or possibly reestablished according to a session policy.

In other embodiments, a fabric manager or even a network element can automatically establish a session. For example, element A 220 can be programmed to identify specific protocols within communication 210 (e.g., SSL, HTTPS, FTP, etc. . . . ) by observing protocol headers corresponding to any level of a communication stack. Preferred sessions are established to manage communications at a network layer (e.g., IPv4, IPv6, etc. . . . ) of the communication stack, or more preferably at the link layer (e.g., Ethernet). When a target protocol is identified, a session between port P1 and P2 can be established. It is also contemplated that element A 220 could trigger the establishment of a session based on any observed data pattern within communication 210, including application data in a payload portion of communication 210. Another contemplated condition for establishing a session can include the detection of an IGMP message, possibly regarding the formation of a multicast group. When a group is formed or members join, a session can be established for the ports to which the group members are connected.

Consider, for example, a fabric used for a storage system based on iSCSI where an iSCSI initiator sends data to a secure Logical Unit Number (LUN) on an iSCSI target. Elements 220 could be programmed to be sensitive to iSCSI LUNs. When element A 220 detects a data transfer to the secure LUN within communication 210, element A 220 or possibly a fabric manager can establish a secure session between port P1 and an iSCSI target located on port P2. Communication between the initiator and the target can occur in a secure fashion without requiring either the initiator or target to employ security measures.

Within a session, a plurality of communication paths can be constructed according to a secure function as discussed more fully below. Chunk 215 associated with a session can then be routed by each of element 220 based on stored path routing information. Distributing chunks 215 among many multiple paths reduces a risk of communication 210 being compromised because an external hostile entity would be forced to listen on all links and all data channels to ensure that they could reconstruct communication 210.

One should note that sessions can coexist with each other and with other routing functions of the fabric. For example, multiple sessions could exist within fabric 200 at the same time. A session could be established for ports P1 and P2 while a second session can be established for ports P3 and P4. Yet another session can be established for ports P1, P3 and P4. The example sessions can all coexist or potentially overlap where a port can belong to more than one session. Additionally, a session can co-exist along with existing established routes within fabric 200 without impacting nominal operation of fabric 200.

Although only elements 220 within a session might need detailed session information or session routing information, it is also contemplated that elements 220 outside a session could utilize at least a portion of the session information. For example, a fabric manager can supply all elements 220 with data indicating which of the nearest neighboring elements 220 is associated with a session. When communication paths within a session are rerouted, an element 220 might be removed from the session. If the element 220 has a chunk 215 in transit, element 220 would likely use the nearest neighbor information to route the chunk 215 back into its session.

Communication Paths

Fabric 200 illustrates a session having two constructed paths from port P1 to P2. However, one skilled in the art will recognize that any number of paths can be constructed.

Communication paths are constructed within a session where the paths represent different routes from a first port (e.g., port P1) to a second port (e.g., port P2). A communication path can be represented by intervening elements 220 traversed across fabric 200. For example, port P1 is connected to port P2 via two paths defined by elements 220 "CBE" and defined by elements 220 "DGF". Preferred communication paths within a session lack common elements 220 other than the edge elements 220. Each leg of a path between two elements 220 comprises one or more links or possibly one or more data channels on the links.

In a preferred embodiment, a fabric manager constructs a plurality of communication paths within a session according to a secure function. As used herein "secure function" means an algorithm that has protections in place to prevent an unauthorized entity from gaining access to the function. Preferred secure functions operate based on a secure key known only to the fabric manager or possibly known to elements 220. Keys can be exchanged with the fabric manager or other elements using known key exchange protocols (e.g., Diffie-Hellman or its variants). An example of a secure function includes an algorithm that uses a secret key as a seed for a pseudo-random number generator. The algorithm can use generated pseudo-random numbers to select paths through fabric 200.

As communication paths are contrasted, one or more parameters of the paths can be configured. Path parameters provide elements 220 with information on how each path should be function or behave while existing within a session. Contemplated parameters include indications of preferred cipher algorithms between elements, preferred data channels on links, number of links between elements, or other parameters. Preferred parameters aid in defining encryption processes in support of conducting parallel encryption of communication 210.

The number of paths between ports can be adjusted according to a desired application. Applications requiring high throughput might require a larger number of paths (e.g., greater than 10 paths) while a low bandwidth application might only rely on two paths that are constantly reconfigured in a secure fashion.

Preferred communication paths lack loops where an element is traversed more than once. Eliminating loops reduces overall complexity of routing algorithms while also ensuring that latency remains low (e.g., less than 10 microseconds). However, loops could be employed to further obfuscate traffic patterns through the fabric.

It is also contemplated that different paths within a session could have a different number of hops. During path construction the secure function can be configured to compensate for differences between paths possibly caused by differences in link latency, number of hops, or other difference. The secure function can use one or more fabric metrics to optimize which links between elements 220 should be used or even which data channels on a links should be used. Contemplated fabric metrics include Quality of Service (QoS), throughput, congestion, latency, collisions, or other network metric.

A fabric manager preferably updates elements 220 with information relating to the constructed paths. In some embodiments, each element 220 associated with a session stores session communication path routing information for its own ports. The routing information can include which ports of element 220 are ingress or egress ports relative to data flow through the element. Element 220 uses the path routing information to determine through which port to forward a data chunk 215. In other embodiments, each element 220 can store complete information of all sessions so that the element can become a new fabric manager at any time should circumstances dictate.

Once communication paths are constructed within a session, chunks 215 are sent along the paths. If element 220 has more than one egress port associated with a session's constructed paths, then the element 220 can assume responsibility for determining which port should be used to forward chunk 215. Preferably, element 220 utilizes a suitably random function to select an egress port to reduce the risk of an external entity predicting where a chunk 215 will exit the element. Other selection algorithms can also be used, including round robin algorithms, load balancing algorithms, or even algorithms based on fabric metric to ensure optimized local or global performance.

Path Reconfiguration

One should appreciate that the act of constructing paths within a session can also include reconfiguration of the constructed paths, preferably according to a secure function as previously discussed. One or more paths within a session can be reconfigured at any point in time based on a triggering event. Contemplated triggering events include time-based events or condition-based events.

Time-based triggers provide for additional security measures. For example, periodically reconfiguring paths within a session increases the difficulty of a hostile entity tapping into the communication. In some embodiments fabric manager can update elements 220 periodically with new path routing information. In other embodiments, where elements 220 are time synchronized, possibly through GPS, NTP, or other synching means. Each element 220 can use a common secret key to construct communication paths deterministically without requiring communication from a fabric manger. Periodically path reconfiguration can occur on regular intervals, irregular intervals, or other time intervals. Further information regarding reconfiguration of paths can be found in co-owned U.S. patent application Ser. No. 12/120,024 titled "Disaggregated Network Management" where migration of management channels is discussed.

Condition-based triggers provide for addressing potentially problematic events that can arise on fabric 200. Should an element 220, a link, or a data channel fail, communication paths can be reconfigured to compensate so ports P1 and P2 retain connectivity. Additionally, reconfiguration can occur as a function of observed fabric metrics. For example, paths can be reconfigured to address observed conditions including addressing congestion, load balancing, QoS, throughput, latency, or other metric based observations.

Reconfiguration of communication paths can include changing links between elements, changing channels on a link, or rerouting paths through different elements 220. In embodiments where neighboring elements 220 are connected through more than one link, a path can be reconfigured to use any of the individual links or even aggregate links. Preferably neighboring elements 220 can also negotiate which link to use to provide local optimization without requiring input from a fabric manager. Changing a channel on a link can include changing a preferred wavelength for communication on an optic fiber, changing a channel on a wireless port, or changing a signaling protocol on a wire. Rerouting paths can include adding elements to a path, removing elements from a path, or otherwise changing which elements participate along a path.

In a preferred embodiment, reconfiguration of communication paths within a session is completed rapidly (e.g., less than 10 microsecond). Rapid reconfiguration provides for converging on a new set of communication paths within a session while retaining connectivity among ports of the session. Preferably reconfiguration can occur in a time period shorter than the average latency experienced by the communicating device to ensure the communicating devices have a reduced risk of noticing a delay. Distributed core fabrics implemented with Raptor switch technology offers an ideal platform for handling reconfiguration of communications paths. A Raptor fabric is capable of establishing routes through a fabric in less than five microseconds.

One should note that reconfiguration can also occur while chunk 215 is in transit. Once reconfiguration of the paths is complete, elements 220 can be updated with the new configuration information by a fabric manager, or can be updated internally based on a deterministic algorithm. It is contemplated that an element 220 could be removed from a communication path while also having a chunk 215 that is in transit. Under such conditions, element 220 has several options on forwarding chunk 215 toward its destination. One option includes forwarding chunk 215 to a nearest neighboring element 220 that is still within the session as determined from updated session information. Another option includes forwarding chunk 215 toward its destination using the conventional routes of fabric 200. A third option includes forwarding chunk 215 to the fabric manager for insertion back into the session.

Fragmenting a Communication

Communication 210 can be divided into at least two chunks 215 according to any suitable algorithm. Preferably fabric 200 is responsible for fragmenting communication 210. In a preferred embodiment, the algorithm accepts packets (e.g., Ethernet frames, time slots in a time-division multiplexing system, etc. . . . ) received on a port as input. The algorithm outputs two or more data chunks 215 where chunks 215 can comprise any acceptable rearrangement or reconfiguration of communication 210. It is also contemplated that the algorithm can transform data within communication 210 to provide additional security measures through encryption, compression, addition of dummy data, scrambling, or other transformation.

The algorithm used to divide communication 210 into chunks 215 can also be sensitive to protocols used for communication at any level of a communication stack. Some embodiments could aggregate fragments of a datagram into communication 210 before dividing the complete datagram into chunks 215. Other embodiments could operate only on parts of a protocol's data. For example, in a storage area network application based on iSCSI, only iSCSI packets where data is read or written might be divided into chunks 215 while other iSCSI packets are not. Such an approach secures critical data while other, non-critical operations retain high performance.

Chunks 215 can have one or more attributes embedded within the chunk for use in reconstructing communication 210. For example, an attribute can include a communication identifier used to associate one or more of chunks 215 with communication 210. Another example of an attribute includes a sequence number assigned to each chunk 215 where each sequence number is different. The sequence numbers can be used to reconstruct communication 210 from its constituent chunks 215. An astute reader will recognize the similarities of such attribute identifiers to those used for Internet Protocol (IP) fragmentation and reassembly described in RFC 791 available from the Internet Engineering Task Force (www.ietf.org). However, all other forms of fragmentation and reassembly are also contemplated. Other contemplated attributes including number of chunks in the communication, or indications of transformations used to prepare chunks 215 (e.g., compression algorithm used, encryption algorithm used, keys, tokens, etc. . . . ).

Chunks 215 can be of any desirable size. Smaller sized chunks are preferred over larger sized chunks, more preferably less than approximately 600 bytes. Chunks 215 of less than 600 bytes are particularly well suited for storage area network applications where storage devices store data based on 512 byte sectors. As an example, consider an Ethernet jumbo frame having a size of 9 KB. The jumbo frame could be divided into 18 or more chunks each having 512 bytes of data. It is also contemplated that chunks 215 could be even smaller; on the order of 100 bytes, 10 bytes, or even 1 byte. It is also contemplated chunks having a size on the order 1000 bytes would be acceptable for super jumbo frames or aggregated datagrams.

Reassembling a Communication

Eventually chunks 215 migrate to their destination port, port P2 located on element H 220 for example. As chunks 215 arrive at element H 220, the element reconstructs communication 210 from chunks 215 by inspecting each chunk 215 for attributes indicating a method of reassembly. Element H 220 can group chunks 215 according to their communication identifier and then arrange chunks 215 having the same communication identifier according to their sequence numbers.

If the data of communication 210 has been transformed, element H 220 can use an inverse transform to reconstruct communication 210. After reassembly, communication 210 can be presented to the device connected to port P2.

Methods of Secure Communication

Figure 3:
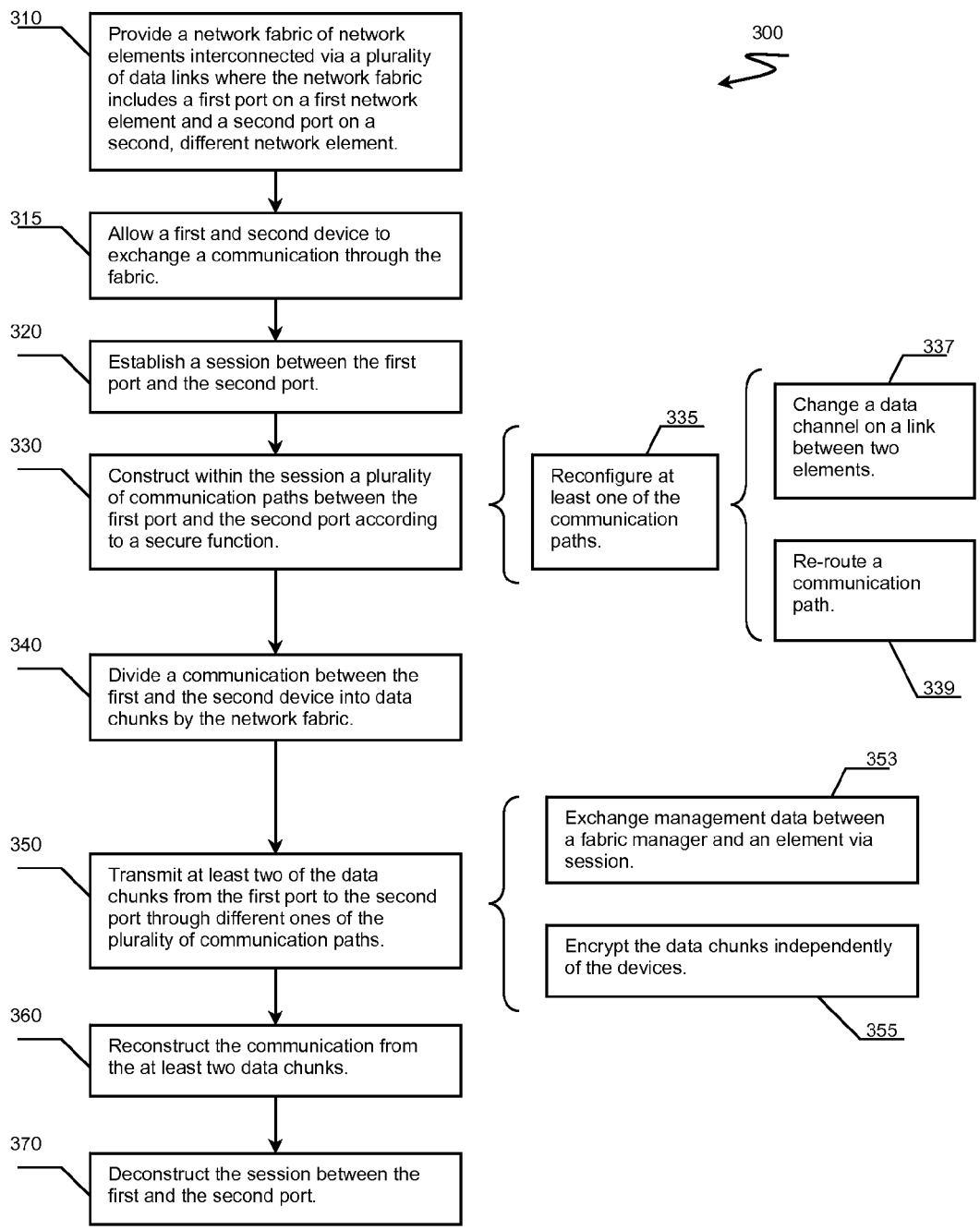
FIG. 3 is a schematic of a method for providing a secure communication between two devices.

FIG. 3 presents method 300 for securing a communication between a first device and a second device over a network fabric using the subject matter presented above. Although the steps of method 300 are presented in a specific sequence, one should note the steps can be reordered while still falling within the scope of the inventive subject matter.

At step 310 a network fabric is provided where the fabric comprises a plurality of network elements interconnected via a plurality of data links. The network fabric preferably comprises a first port on a first network element and a second port on a second, different network element. The fabric forms a communication infrastructure available to devices connected to the ports of the fabric.

At step 315 a first device and a second device are allowed to exchange a communication through the fabric. The communicating devices can couple to the fabric through the ports of the fabric. In some embodiments, a device can be authenticated before being allowed use to the fabric or use the secure features of the fabric. Suitable authentication methods can include validating MAC address, using a password, or any other forms of authentication.

At step 320 a session can be established between, or among, the ports used by the communicating devices. In a preferred embodiment, a fabric manager possibly comprising one of the network elements, establishes the session and assigns a session an identifier as previously discussed. Preferably the session is secured through a secret key where session management data can only be understood by those elements having access to the secret key. The fabric manager informs the fabric elements of the session by sending management data having the session identification information or having information associated with the communication paths of the session. Preferably the session is established autonomously with respect to the communicating devices to alleviate processing overhead on the devices.

At step 330, within the session a plurality of communications paths connecting the ports of the session are constructed according to a secure function. The paths preferably are different from each other by at least one data link between elements. More preferred paths different by a least one intervening element. Yet more preferred paths differ from each other by having no elements (other than the edge elements) in common. The secure function preferably operates based on a secret key known only to a fabric manager or only to the fabric elements. Additionally, constructing paths can occur in a manner transparent to the communicating devices. This approach further alleviates processing overhead on the devices as well as protects routing information from external entities.

Constructing paths can also include reconfiguring at least one of the paths as contemplated by step 335. Paths can be reconfigured by changing a data channel on a data link between two elements (step 337), or by rerouting at least one of the communication paths within the session (step 339). Additionally, paths can be reconfigured periodically according to a secure function based on a secret key to further protect communication by restructuring paths. Preferably the fabric can support reconfiguration of communication paths while a data chunk is in transit without loss of the chunk. Furthermore a preferred embodiment can reconfigure the paths in a time period shorter than average latency experienced by the communicating devices.

At step 340, the network fabric can divide the communication into data chunks. Data chunks can be created from the original communication in any desirable form to secure the communication. For example, chunks can vary in size, data within the chunks can be transformed, or chunks can be converted to fit the natural characteristics of a target device. Storage area network applications, for example, might prefer data chunks having application data of 512 bytes. Any size can be utilized including sizes on the order of 1 KB, 100 bytes, 10 bytes, or even 1 byte.

At step 350 data chunks are transmitted from an originating port to the port connected to the destination device. Preferably, at least two of the chunks are transmitted from the originating port to the destination port through different ones of the communication paths. In some embodiments, at step 353, data within the chunks can be encrypted independently of the communicating devices before, or even during, transmission from element to element. In more preferred embodiments, chunks can be encrypted differently from each as they are exchanged between elements where each pair of elements can employ different cipher algorithms than other pairs to encrypt data chunks.

One should appreciate that encrypting chunks as they traverse the fabric provides for a parallel encryption engine where each element along a path is able to support the encryption process. Communications transported across the fabric can be secured at each leg of their journey while still retaining a high throughput, preferably greater than 10 Gbps. Communicating devices using the fabric no longer suffer from the overhead of maintaining a high throughput communication connection.

At step 355, it is contemplated that a fabric manager can utilize one or more secure sessions to exchange management data with the fabric elements. In such an approach, fabric elements can take on the role of communicating devices using a "fabric within a fabric" to exchange management data.

Once a sufficient number of chunks arrive near the destination, the network fabric can reconstruct the communication from its constituent chunks as indicated by step 360. Preferably the network element connected to the destination device reconstructs the communication before presenting the communication to the destination device.

At step 370 a session can be deconstructed as desired. Session deconstruction can occur manually through the action of a system administrator, preferably through management software. Sessions can also be deconstructed automatically by the management software operating according to a session policy or through the action of fabric manager.

One should appreciate the varied applications for the disclosed techniques. Applications that would particularly benefit from the outlined approach include storage area network applications, distributed computing applications where a fabric can operate as a computing bus, long haul wide area networks that exchange sensitive data, or corporate and government networks separated by geographically significant distances.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method of securing a communication between a first device and a second device over a network fabric, the method comprising:
   providing a network fabric of network elements interconnected via a plurality of data links where the network fabric includes a first port on a first network element and a second port on a second, different network element;
   allowing the first device and the second device to exchange a communication through the network fabric;
   establishing a secure port-to-port session between the first port and the second port;
   constructing within the port-to-port session a plurality of communication paths between the first port and the second port, where the communication paths are constructed from active data links selected from the plurality of data links according to a secure function that operates based on a secret key, and where each communication path differs from each other by at least one intervening network element;
   dividing the communication into data chunks by the network fabric; and
   transmitting at least two of the data chunks from the first port to the second port through different ones of the plurality of communication paths.

2. The method of claim 1, further comprising deconstructing the session.

3. The method of claim 1, wherein the step of establishing the session occurs autonomously with respect to the first and the second device.

4. The method of claim 1, wherein the step of constructing the plurality of communication paths occurs in a manner transparent to the first and second device.

5. The method of claim 1, wherein the step of constructing the plurality of communication paths includes reconfiguring at least one of the plurality of communications paths.

6. The method of claim 5, wherein the step of reconfiguring includes changing a data channel on a data link between two of the elements.

7. The method of claim 5, wherein the step of reconfiguring includes rerouting the at least one of the plurality of communications paths.

8. The method of claim 5, wherein the step of reconfiguring occurs while at least one of the data chunks is in transit.

9. The method of claim 5, wherein the step of reconfiguring occurs in a time period shorter than the average latency experienced by the first and the second device.

10. The method of claim 5, wherein the step of reconfiguring occurs periodically according to the secure function.

11. The method of claim 1, wherein the session is at or below a network layer.

12. The method of claim 1, wherein the session is secured through exchange of the secret key between a fabric manager and the first network element.

13. The method of claim 1, further comprising encrypting the at least two data chunks independently of the first or the second device.

14. The method of claim 13, wherein a first data chunk is encrypted differently than a second data chunk.

15. The method of claim 1, wherein a fabric manager performs the steps of establishing the session and constructing the communication paths; and wherein the fabric manager comprises one of the network elements.

16. The method of claim 15, further comprising exchanging management data between the fabric manager and at least one of the network elements via the session.

17. The method of claim 1, wherein the first and the second device comprise network elements of the fabric.

18. The method of claim 1, wherein the fabric comprises a distributed core fabric.

19. The method of claim 18, wherein the network elements comprise switches.

20. The method of claim 1, further comprising the network fabric reconstructing the communication from the at least two data chunks.

* * * * *